(12) United States Patent
Bissen et al.

(10) Patent No.: US 11,242,274 B2
(45) Date of Patent: *Feb. 8, 2022

(54) BEVERAGE DISPENSER AND METHOD THEREFORE FOR SUPPRESSION OF GERM FORMATION

(71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,449

(22) Filed: Aug. 16, 2019

(65) Prior Publication Data
US 2020/0055761 A1 Feb. 20, 2020

Related U.S. Application Data

(63) Continuation of application No. 16/542,417, filed on Aug. 16, 2019.

(30) Foreign Application Priority Data

Aug. 16, 2018 (EP) ..................... 18189367

(51) Int. Cl.
*C02F 9/00* (2006.01)
*A47J 31/46* (2006.01)
(Continued)

(52) U.S. Cl.
CPC ............... *C02F 9/00* (2013.01); *A47J 31/468* (2018.08); *B67D 1/0032* (2013.01);
(Continued)

(58) Field of Classification Search
CPC ... A47J 31/468; B67D 1/0032; B67D 1/0058; B67D 1/0074; B67D 1/0075;
(Continued)

(56) References Cited

U.S. PATENT DOCUMENTS 7,578,912 B2 * 8/2009 Buehler ............. G01N 27/4035
204/403.01
9,370,746 B2 * 6/2016 Manabe .................. B01D 61/12
(Continued)

OTHER PUBLICATIONS

European Patent Office: "European Search Report"; Application No. EP 18 18 9367; dated Nov. 21, 2018.
(Continued)

*Primary Examiner* — Terry K Cecil
(74) *Attorney, Agent, or Firm* — Bryan W. Bockhop; Bockhop Intellectual Property Law, LLC (57) ABSTRACT

The present invention discloses a beverage dispenser, including: an inlet connected to a water source; an outlet for dispensing the water to a user vessel; at least one filter element having an input and an output for filtered water; a pump for pumping water to the input of the filter element; a flow sensor connected between the inlet and the outlet, wherein the flow sensor determines the actual flow rate of the water; at least one water preparation element connected between the output for outputting filtered water and the outlet and adapted to prepare the water for drinking by a human, wherein the water preparation element comprises a water preparation rate input by which the water preparation rate of the water preparation element can be controlled; and a controller connected to the water preparation rate input of the water preparation element and the flow sensor, wherein the controller controls the water preparation rate of the water preparation element by a signal to the water preparation rate input such that the water preparation rate is proportional to the actual flow rate.

15 Claims, 2 Drawing Sheets

(51) Int. Cl.
*C02F 1/00* (2006.01)
*C02F 1/28* (2006.01)
*C02F 1/42* (2006.01)
*C02F 1/44* (2006.01)
*C02F 1/68* (2006.01)
*B67D 1/00* (2006.01)
*B67D 1/12* (2006.01)
*B67D 1/08* (2006.01)

(52) U.S. Cl.
CPC .......... *B67D 1/0058* (2013.01); *B67D 1/0074* (2013.01); *B67D 1/0075* (2013.01); *B67D 1/0076* (2013.01); *B67D 1/0884* (2013.01); *B67D 1/0888* (2013.01); *B67D 1/1204* (2013.01); *B67D 1/1234* (2013.01); *B67D 1/1243* (2013.01); *B67D 2210/0001* (2013.01); *B67D 2210/00118* (2013.01); *C02F 1/003* (2013.01); *C02F 1/283* (2013.01); *C02F 1/42* (2013.01); *C02F 1/441* (2013.01); *C02F 1/68* (2013.01); *C02F 2001/422* (2013.01); *C02F 2001/425* (2013.01); *C02F 2209/02* (2013.01); *C02F 2209/03* (2013.01); *C02F 2209/05* (2013.01); *C02F 2209/06* (2013.01); *C02F 2209/40* (2013.01)

(58) Field of Classification Search
CPC .. B67D 1/0076; B67D 1/0884; B67D 1/0888; B67D 1/1204; B67D 1/1234; B67D 1/1243; B67D 2210/0001; B67D 2210/00118; C02F 1/003; C02F 1/283; C02F 1/42; C02F 1/441; C02F 1/68; C02F 2001/422; C02F 2001/425; C02F 2209/005; C02F 2209/02; C02F 2209/03; C02F 2209/05; C02F 2209/06; C02F 2209/40; C02F 2307/10; C02F 9/00
See application file for complete search history.

(56) References Cited

U.S. PATENT DOCUMENTS

| | | | |
|---|---|---|---|
| 10,017,372 B2 * | 7/2018 | Bethuy | B67D 1/07 |
| 10,273,165 B1 * | 4/2019 | Branum | G07F 13/00 |
| 10,549,977 B2 * | 2/2020 | Kim | B67D 1/0884 |
| 2002/0158018 A1 | 10/2002 | Abramowitz et al. | |
| 2003/0019764 A1 | 1/2003 | Baldwin et al. | |
| 2017/0088410 A1 * | 3/2017 | Wing | B67D 1/0022 |

OTHER PUBLICATIONS

European Patent Office: "European Search Report" (EP 18189367); dated Nov. 21, 2018; EPO; Search report in corresponding European application.

* cited by examiner

BEVERAGE DISPENSER AND METHOD THEREFORE FOR SUPPRESSION OF GERM FORMATION

CROSS-REFERENCE TO RELATED APPLICATION(S)

This application claims the benefit of European Patent Application No. EP18189367.8, filed Aug. 16, 2018, the entirety of which is hereby incorporated herein by reference.

This application is a continuation of, and claims the benefit of, U.S. patent application Ser. No. 16/542,417, filed Aug. 16, 2019, the entirety of which is hereby incorporated herein by reference.

BACKGROUND OF THE INVENTION

1. Field of the Invention

The present invention relates to an improved beverage dispenser and a method therefore, particularly for generating water by individual water recipes in a reproducible way. Further germ formation is suppressed.

Water is drunken primarily by humans to satisfy their thirst. Water is also drunken for other reasons such as accompanying a meal, refreshment and the like. Humans are increasingly demanding in selecting the suitable water.

After sports, when a human was sweating he should drink water having a higher concentration of minerals. For accompanying a meal or for refreshment a user might prefer another type of water having a different and lower concentration of minerals.

2. Description of the Related Art

WO 2016/090235 A1 discloses a portable hydration system including a mechanical or an electromechanical mechanism for dispensing additives into a liquid. Such additives include solids, liquids, powders, gases and include vitamins, minerals, nutritional supplements, pharmaceuticals and other consumables. Dispensing is initiated manually by direct user action, automatically by the device and/or external through an associated application on a user device. Dispensing is adjustable by context factors such as user preferences, location, activity and psychological status.

DE 20 2010 006 679 U1 discloses an apparatus for generating mineral water having a filter and at least one mineral container between the filter and the outlet. The apparatus further comprises a controller for controlling the feed of mineral from the at least one mineral container. If the water consumption by the user exceeds a daily limit of the daily water consumption feeding of minerals is stopped or another specific formulated water is dispensed.

WO 94/06547 A1 discloses a water purification and dispensing apparatus comprising a water inlet for obtaining water from a supply source, a water purification system for removing impurities from the source water and a mineral addition system for adding desired minerals into the purified water.

The prior art systems are directed to providing mineralization to a user consuming the water. However, the systems do not take into account the preferences of the user. If the user has to drink water with a predetermined concentration of minerals user might dislike the water and stop using the prior art system.

In prior art systems tanks are used for cooling the water and for carbonizing water. In these tanks stagnation occurs, leading to germ formation. There is a need for a water dispenser that suppresses germ formation.

SUMMARY OF THE INVENTION

It is an object of the present invention to provide a user water having a higher quality. In one aspect of the invention, germ formation is to be suppressed. According to another aspect of the invention operation of the beverage dispenser is to be monitored. According to another aspect of the invention a higher diversity of possible water recipes shall be provided.

According to a first aspect the invention discloses a beverage dispenser comprising an inlet connected to a water source, an outlet for dispensing the water to a user vessel, at least one filter element having an input and an output for filtered water, a pump for pumping water to the input of the filter element, a flow sensor connected between the inlet and the outlet, wherein the flow sensor determines the actual flow rate of the water.

At least one water preparation element is connected between the output for outputting filtered water and the outlet and adapted to prepare the water for drinking by a human. The water preparation element comprises a water preparation rate input by which the water preparation rate of the water preparation element can be controlled. A controller is connected to the water preparation rate input of the water preparation element and the flow sensor. The controller controls the water preparation rate of the water preparation element by a signal to the water preparation rate input such that the water preparation rate is proportional to the actual flow rate. The water preparation rate is a value defining how much water is prepared for drinking by a human in a predetermined time span.

The water preparation element is a flow type water preparation element. The water flows through the water preparation element with the same flow rate as through the flow sensor. Since the water does not stagnate germ formation can be avoided.

The invention discloses according to the first aspect also a method for preparing beverage comprising steps of drawing water from a water source, filtering the water, determining the actual flow rate of the filtered water, and preparing the water for drinking by a human by an adjustable preparation rate, wherein the adjustable preparation rate is proportional to the actual flow rate, and outputting the beverage into a user vessel.

The invention discloses according to a second aspect a beverage dispenser comprising an inlet connected to a water source, an outlet for dispensing the water to a user vessel, at least one filter element having an input and an output for filtering water, a pump for pumping water to the input of the filter element, a flow sensor connected between the inlet and the outlet. The flow sensor determines the flow rate of the water. The beverage dispenser comprises at least one water preparation element connected between the output for outputting filtered water and the outlet and adapted to prepare the water for drinking by a human. The water preparation element comprises a water preparation rate input, by which the water preparation rate of the water preparation element can be controlled. The beverage dispenser comprises a controller connected to the water preparation rate input of the water preparation element, the pump and the flow sensor. The controller controls the pump such that filtered water has an actual flow rate that corresponds to a set flow rate, wherein the actual flow rate is determined by the flow sensor.

The invention also discloses according to the second aspect a method for preparing beverage comprising the steps of drawing in water from a water source, pressurizing the water by an adjustable pressure, filtering the water, preparing the water for drinking by a human, determining the actual flow rate of the filtered water, and outputting the beverage into a user vessel, wherein the water is pressurized such that the actual flow rate is within a set flow rate range.

According to the second aspect the water preparation element comprises a water preparation rate input by which the water preparation rate of the water preparation element can be controlled. The controller is connected to the water preparation rate input of the water preparation element and the flow sensor, wherein the controller controls the water preparation rate of the water preparation element by a signal to the water preparation rate input such that the water preparation rate is proportional to the actual flow rate.

In a preferred embodiment the flow sensor is connected between the output for outputting filtered water and the outlet, wherein the flow sensor determines the actual flow rate of the filtered water.

In another embodiment the flow sensor may be arranged between the inlet and the input of the filter element. In this case the difference between the flow rate upstream of the filter element and downstream of the filter element is neglected.

In still another embodiment a second flow sensor may be arranged and downstream of a second output of the filter element by which undesired components of the water are discharged. The controller may determine the flow rate between the output of the filter element and the outlet by subtracting the flow rate determined by the second flow sensor from the flow rate determined by the flow sensor coupled between the inlet and the input of the filter element.

The filter element may include a demineralizer demineralizing the water, an ion exchanger exchanging ions in the water, a distillation and condensation unit distilling and condensing the water and/or a filter for absorbing particles and/or minerals in the water.

The water preparation element may be a flow type tempering device for cooling and/or heating the water, a flow type carbonizer for injecting carbon dioxide into the water, a flow type mineralization device for mineralizing the water, a flow type colorant device for coloring the water, a flow type flavoring device for flavoring the water, a flow type medication device for adding medicine to the water, and/or a flow type additive introduction device for introducing additives into the water.

The filter element may comprise a reverse osmosis filter having an input, a permeate output and a concentrate output, wherein the permeate output is the output for filtered water.

The flow type tempering device may be coupled between the output for outputting filtered water of the filter element and the outlet of the beverage dispenser. The flow type tempering device tempers the water flowing with the set actual flow rate determined by the flow sensor through the flow type tempering device. Thereby, stagnation of the beverage in the flow type tempering device is avoided. The flow type tempering device can be a cooler and/or a heater.

The flow type carbonizer may be coupled between the output for outputting filtered water of the filter element and the outlet of the beverage dispenser. The carbonizer is operated such that water flows with the set flow rate through the carbonizer as it is carbonized and/or a carbonization rate of the flow-type carbonizer is proportional to the actual flow rate determined by the flow sensor. By this approach it can be ensured that the actual carbonization of the beverage is within a set carbonization range of the beverage. Further, stagnation in the flow type carbonizer can be avoided.

The mineralization device may be coupled between output for outputting filtered water of the filter element and the outlet of the beverage dispenser. The mineralization device is operated such that the water flows with the set flow rate through the mineralization device as minerals are added to the water and/or a mineralization rate of the mineralization device is proportional to the set flow rate determined by the flow sensor. By this approach it can be ensured that the actual mineralization of the beverage is within a set mineralization range of the beverage. Moreover, stagnation of beverage in the mineralization device can be avoided.

The water flows from output for outputting filtered water of the filter element to the outlet of the beverage dispenser with the set flow rate through any component located between the permeate output to the outlet of the beverage dispenser Thereby, stagnation of beverage in the portion of the beverage dispenser, in which the beverage is prepared for drinking can be avoided.

The flow rate from the inlet of the beverage dispenser to the input of the filter element is constant in any component though which the water flows between the inlet of the beverage dispenser to the input of the filter element. Thereby, stagnation of water in the prefiltering portion of the beverage dispenser can be avoided.

The beverage dispenser may comprise an output valve coupled between the water preparation element and the outlet of the beverage dispenser and connected to the controller. The controller is adapted to switch the output valve in a first state, in which the beverage is output to the user vessel or in a second state in which the beverage is passed to a drain. The controller switches the output valve into the first state, if the user instructs the beverage dispenser to output beverage and the controller determines that the beverage preparation element has prepared the water such that at least one actual preparation value is within a set range. The controller switches the output valve into the second state, if the user instructs the beverage dispenser to output beverage and the controller determines that the beverage preparation element has prepared the water such that at least one actual preparation value is not within a set range. The controller switches the output valve into the second state, if the user instructs the beverage dispenser to abort outputting beverage. As long as at least one beverage preparation parameter is not within the set range, the beverage is drained. As soon as at least one beverage preparation parameter is within the set range, the beverage is output to the outlet of the beverage dispenser into the user vessel.

The beverage preparation parameter may be determined by at least one suitable sensor, such as a temperature sensor, ion selective sensor, pH-value sensor or the like described below. The beverage preparation parameter may be a temperature of the beverage, a carbonization and/or mineralization.

According to an embodiment of the first aspect the invention discloses a beverage dispenser comprising an inlet connected to a water source, an outlet for dispensing the water to a user vessel and at least one reverse osmosis filter having an input, a permeate output and a concentrate output. The beverage dispenser further comprises a pump for pumping water to the input of the reverse osmosis filter. A flow sensor is connected between the permeate output and the outlet, wherein the flow sensor determines the flow rate of the permeate. The beverage dispenser further comprises a controller connected to the pump and the flow sensor. The controller controls the pump such that permeate has an actual flow rate that corresponds to a set flow rate, wherein the actual flow rate is determined by the flow sensor. The pump is controlled such that the flow rate downstream of the permeate output is constant independent of the amount of concentrate that is withdrawn from the water supplied by the water source.

According to a third aspect the invention discloses a beverage dispenser comprising an inlet connected to a water source, an outlet for dispensing the water to a user vessel and at least one filter element having an input and an output for filtered water. A mineralization device is coupled between the output for filtered water of the filter element and the outlet of the beverage dispenser. The beverage dispenser further comprises at least one ion concentration sensor connected to the controller and arranged downstream of the output of the mineralization device, wherein the ion concentration sensor is adapted to determine the concentration of a predetermined type of ion in the water. The beverage dispenser further comprises a controller, wherein the controller is adapted to determine the actual ion concentration of at least one predetermined ion type by the at least one ion concentration sensor. Thereby, operations of the beverage dispenser and particularly the mineralization device can be controlled.

According to a fourth aspect invention discloses an inlet connected to a water source, an outlet for dispensing the water to a user vessel and at least one reverse osmosis filter having an input, a permeate output and a concentrate output. The beverage dispenser further comprises a mineralization device coupled between the permeate output of the reverse osmosis filter and the outlet of the beverage dispenser. The beverage dispenser further comprises at least one ion exchanger adapted to exchange at least one type of ion. The at least one ion exchanger is located downstream of the mineralization device and upstream of the outlet. The mineralization device can generally only supply a limited amount of different types of ions to the water demineralized by the reverse osmosis filter. By exchanging predetermined type of ions the water can be adapted to a user preference and a higher amount of different type of ions may be supplied to the water delivered to the user.

The at least one filter element may be a reverse osmosis filter having an input, a permeate output and a concentrate output.

The water source of the above beverage dispenser may be a tap or an external tank, for example.

The beverage dispenser may comprise a flow type water tempering device coupled between the permeate of the reverse osmosis filter and the outlet of the beverage dispenser, wherein the flow type water tempering device tempers the water flowing with the set flow rate through the flow type tempering device. The water is not cooled in an internal tank in which the water stagnates. Thereby, germ formation can be suppressed effectively.

The beverage dispenser further comprises a flow type carbonizer coupled between the permeate output of the reverse osmosis filter and the outlet of the beverage dispenser, wherein the water flows with a set flow rate through the carbonizer as it is carbonized. The water is not carbonized in a tank, in which stagnation occurs. Thereby, germ formation can be suppressed effectively.

Also, the beverage dispenser according to the first or second aspect may comprise a mineralization device coupled between the permeate output of the reverse osmosis filter and the outlet of the beverage dispenser. The water flows with the set flow rate through the mineralization device as minerals added to the water. The mineralization device is a flow type mineralization device without tanks in which water can stagnate. Also thereby, germ formation can be avoided.

The water flows from the permeate output to the outlet of the beverage dispenser with the set flow rate through any component located between the permeate output and the outlet of the beverage dispenser.

Since the water flows with a constant flow rate, no stagnation of water occurs in the beverage dispenser. Thereby, germ formation can be avoided. The term "flow rate" does not imply that the water must pass with a constant velocity through the components in the beverage dispenser. The actual velocity of the water may be determined by the diameter or flow section of the respective component. The term "flow rate" may imply that a predetermined amount of water has to pass a predetermined component or location within the beverage dispenser within a predetermined time span.

The flow rate from the inlet of the beverage dispenser to the input of the reverse osmosis filter is constant in any component through which the water flows between the inlet of the beverage dispenser to the input of the reverse osmosis filter.

No tank, in which water can stagnate is arranged between the permeate output of the reverse osmosis filter and the outlet of the beverage dispenser. Additionally or alternatively, no tank, in which water can stagnate, is arranged between the inlet of the beverage dispenser and the input of the reverse osmosis filter. Since the water cannot stagnate in the beverage dispenser, germ formation is effectively avoided within the beverage dispenser.

A reverse osmosis filter input pressure sensor may be connected to the controller and arranged at the input of the reverse osmosis filter for determining the pressure at the input of the reverse osmosis filter. A reverse osmosis permeate output pressure sensor may be connected to the controller and arranged at the reverse osmosis permeate output for determining the pressure at the reverse osmosis permeate output. The controller determines, whether the pressure difference between the pressure determined by the reverse osmosis filter input pressure sensor and the pressure determined by the reverse osmosis permeate output pressure sensor is within a predetermined range. If the pressure difference is not within the predetermined range, the membrane may be porous, if the pressure difference is too low. If the pressure difference is too high, the membrane may be clogged or congested.

A permeate conductivity sensor may be connected to the controller and arranged at the permeate output of the reverse osmosis filter. The permeate conductivity sensor is adapted to measure the conductivity of the permeate. The controller determines, whether the conductivity of the permeate is within a predefined range. If the conductivity of the permeate is not within a predefined range, such as too high, stagnation, back diffusion or germ formation might have been occurred.

A flow type tempering device input pressure sensor may be connected to the controller and arranged at the input of the flow type tempering device for determining the pressure at the input of the flow type tempering device. The flow type tempering device output pressure sensor may be connected to the controller and arranged at the flow type tempering device output for determining the pressure at the flow type tempering device output. The controller may determine, whether the pressure difference between the pressure determined by the flow type tempering device input pressure sensor and the pressure determined by the flow type tempering device output pressure sensor is within a predetermined range. If the pressure difference is too high, the flow type tempering device may be clogged. If the pressure difference is too low, a leakage may occur, for example.

A flow type carbonizer input pressure sensor may be connected to the controller and arranged at the input of the flow type carbonizer for determining the pressure at the input of the flow type carbonizer. A flow type carbonizer output pressure sensor may be connected to the controller and arranged at the flow type carbonizer output and determining the pressure at the flow type carbonizer output. The controller determines, whether the pressure difference between the pressure determined by the flow type carbonizer input pressure sensor and the pressure determined by the flow type carbonizer output pressure sensor is within a predetermined range. For example, if the pressure difference is too high, the flow type carbonizer might be clogged. If the pressure difference is too low, a leakage within the flow type carbonizer might have been occurred, for example.

A pH-value sensor may be connected to the controller and arranged at or downstream of the output of the flow type carbonizer for determining the pH-value at or downstream of the output of the flow type carbonizer. The controller determines, whether the pH-value at or downstream of the output of the flow type carbonizer is within a predetermined range. If the pH-value is not within the predetermined range, the actual flow rate does not correspond to the set flow rate and/or the flow type carbonizer is not working properly.

A mineralization device input pressure sensor may be connected to the controller and arranged at the input of the mineralization device for determining the pressure at the input of the mineralization device. A mineralization device output pressure sensor may be connected to the controller and arranged at the mineralization device output and determining the pressure at the mineralization device output. The controller may determine, whether the pressure difference between the pressure determined by the mineralization device input pressure sensor and the pressure determined by the mineralization device output pressure sensor is within a predetermined range. If the pressure difference is above the predetermined range, the mineralization device may be congested, for example. If the pressure difference is below the predetermined range, a leakage might have occurred in the mineralization device, for example.

An ion concentration sensor may be connected to the controller and arranged downstream of the output of the mineralization device in the beverage dispenser. The ion concentration sensor is adapted to determine the concentration of predetermined ions in the water. The controller is adapted to determine, whether the actual ion concentration of the predetermined ion type is within a set concentration range. If the actual ion concentration is not within the set concentration range, the mineralization device and/or the reverse osmosis filter may not operate appropriate.

A first temperature sensor may be arranged downstream of the flow type tempering device, the flow type carbonizer and the mineralization device. The first temperature sensor may determine a first actual temperature. The controller may be adapted to determine, whether the first actual temperature is within a predetermined set range. The first temperature sensor determines the actual temperature of the beverage output to the user as a first actual temperature. If the first actual temperature is not within the set range, the control circuit, i.e. the set temperature, for the output of the flow type tempering device may be adapted. Thereby, a cascaded controller may be achieved.

The beverage dispenser may comprise a heating device having an input connected to the permeate output of the reverse osmosis filter and an output. A second temperature sensor is arranged at the output of the heating device and determining the actual temperature of water at the outlet of the heating device. The controller is adapted to determine, whether the actual temperature of the water at the outlet of the heating device has an actual temperature in a predefined temperature range suitable for disinfecting.

The controller may be adapted to determine, whether the actual ion concentration determined by the at least one ion concentration sensor is within a set concentration range. If the at least one actual ion concentration is not within the set concentration range, the mineralization device and/or reverse osmosis filter might not work properly, for example.

The at least one concentration sensor may comprise a galvanic sensor. The at least one ion concentration sensor may comprise an ion-selective electrode. The ion concentration sensor may generate a voltage depending on the concentration of the at least one predetermined ion.

The ion-selective electrode may comprise an ion-selective membrane, which is adapted to pass only the at least one predetermined ion to the electric electrode.

Ion specific sensors are known to the person skilled in the art and therefore not discussed in further detail herein.

The beverage dispenser may comprise an input/output unit adapted to output data to a user and to receive data input by the user. The beverage dispenser may also comprise a data base for storing water recipes and data about water recipes. The controller may be adapted to receive by the input/output unit commands for generating a user defined water recipe by determining the concentration of at least one ion by the user. The user may determine the ion concentration on the input/output unit. The user can determine the ion concentration by entering a numeric value. Alternatively, or additionally the input/output unit may display graphic tools for determining a set value of the ion concentration.

The controller is adapted to instruct the beverage dispenser to produce water based on the user defined water recipe. The controller is adapted to determine the ion concentration of at least one ion in the water generated by the user defined water recipe using the at least one ion concentration sensor and to store the user generated water recipe in the database. The controller may store the set of values of the ion concentration and/or the actual values of the ion concentration in the database. The input/output unit may be mounted at the beverage dispenser. In another embodiment the input/output unit may be part of a mobile device with a wireless and/or wired connection to the beverage dispenser. In this embodiment, the user can determine a water recipe based on his taste preferences and the actual ion concentration of the water recipe can be stored in the database.

Thereby, the water recipes can be adapted in an appropriate way to the taste preferences of the user.

The controller may be adapted to request the user to assess the water recipe. The controller may request the user to input his assessment into the input/output unit. The controller is further adapted to store the assessment of the water recipe of the user in the database. Since the user preferences are stored in the database, the beverage dispenser may select a suitable water recipe for the user in a more reliable fashion.

The controller may be adapted to display a menu on the input/output unit for enabling the user to select a water recipe. The user may generate the user defined water recipe based on the water recipe selected by the user. The water recipe may be stored in the database. The menu may display water recipes stored in the database. The selected water recipe is a starting water recipe for optimizing the water recipe to the taste preference of the user.

The beverage dispenser may comprise at least one ion exchanger adapted to exchange at least one ion, wherein the at least one ion exchanger is located downstream of the mineralization device and upstream of the outlet. A flow control device may be connected to the controller. The controller is adapted to switch the flow control device such that water passes in a first switching status the at least one ion exchanger and to switch the flow control device such that no water passes in a second switching status the at least one ion exchanger.

The controller may switch the control device in a third status, in which a predetermined portion of the water stream output by the mineralization device is passed to the at least one ion exchanger. In the first switching status, the entire water stream mineralized by the mineralization device is passed to the ion exchanger. In the second switching status no water downstream of the mineralization device is passed through the ion exchanger. In the third switching status a predetermined portion of water output from the mineralization device is passed to the ion exchanger. Thereby, the controller can control how many ions are exchanged.

In one embodiment the ion concentration sensor may be located downstream of the mineralization device and the ion exchanger.

The controller may be adapted to propose the user a proposed water recipe, wherein the user generates the user defined water recipe based on the proposed water recipe. The proposed water recipe may be stored in the database. The proposed water recipe may be the starting point for generating the user generated water recipe.

The controller may select the proposed water recipe based on at least one of a water drinking purpose and a user preference. The water drinking purpose may comprise pleasure, thirst, health, refreshment, diet, pregnancy, breastfeeding, accompaniment of a predetermined type of wine, accompaniment of a predetermined type of food, water for brewing a predetermined type of tea, water for brewing a predetermined type of coffee, at least one physiological parameter of the user, to dilute specific spirits, (brandy, whiskey or the like) water as part of a mixed juice drinks, at least one environment parameter of the location, in which the user is or was, the actual date, the current time, a purpose input by a user.

In one embodiment the at least one ion exchanger may comprise a cation exchanger.

Additionally or alternatively the ion exchanger may comprise an anion exchanger substituting a non-organic anion by an organic anion. Particularly, the anion exchanger may substitute Cl— by citrate and/or SO42- by citrate.

The controller is adapted to receive by the input/output unit commands from the user for generating a user defined water recipe by determining at least one ion to be replaced by the ion exchanger. The user may input such data on an input/output unit of the beverage dispenser or a mobile device, such as a smartphone. The controller is adapted to instruct the beverage dispenser to produce water based on a water recipe. The controller is also adapted to switch the flow control device such that the at least one ion to be replaced is replaced by the ion exchanger. Thereby, the user can optimize the water recipe and decides which ions are to be replaced.

The controller is adapted to receive by the input/output unit commands from the user for generating a user defined water recipe by determining the predetermined portion of at least one ion to be replaced by the ion exchanger from the stream of water. The controller is adapted to switch the flow control device such that the predetermined portion of at least one ion to be replaced is replaced by the ion exchanger. Thereby, the user can determine the quantitative portion of ions to be replaced.

The invention discloses under a fourth aspect a method of producing water by a beverage dispenser comprising the following steps. Water drawn from a water source is demineralized. A water recipe is selected from a database comprising a plurality of water recipes. The demineralized water is mineralized by feeding minerals from a plurality of vessels based on the selected water recipe. The beverage is output to a user vessel. The actual ion concentration in the mineralized water is determined before outputting the water to the user vessel. Thereby, appropriate demineralizing and appropriate mineralizing can be verified.

Under a fifth aspect, the present invention discloses a method of producing water by a beverage dispenser comprising the step of demineralizing water drawn from a water source. A water recipe is selected from a database comprising a plurality of water recipes. The demineralized water is mineralized by feeding minerals from a plurality of vessels based on the selected water recipe. At least a portion of one type of ions is exchanged by another type of ions. The beverage is output to a user vessel. Since ions can be substituted partially or fully in the mineralized water, a broader range of water recipes can be used for mineralizing water with a fixed number of mineralization vessels and or mineralization solutions.

The methods may be embodied as described above in the context of the beverage dispensers.

The method may determine, whether the actual ion concentration is within a predetermined concentration range to monitor proper operation of a beverage dispenser as described above. The method may request a user to generate a user generated water recipe by inputting data for determining a set concentration of at least one ion. The data may be input by the user into a user interface displayed on an input/output unit. The input/output unit may be mounted to a beverage dispenser or may be embodied by external device, such as a mobile device (smartphone, tablet or the like). The demineralized water is mineralized by feeding minerals from a plurality of vessels based on the user generated water recipe. The beverage is output to the user vessel. The actual ion concentration in the mineralized water based on the user generated water recipe is determined before outputting the water to the user vessel. The water recipe is stored in the database.

The method can request the user to assess the user defined water recipe. The method can request the user to input their assessment into the input/output unit. The assessment may be stored in a database.

The method may request the user to select a water recipe stored in the database. The method may request to the user to generate a user generated water recipe by inputting data by determining concentration of at least one ion by the user into the user interface based on the selected water recipe as a starting point.

The method can propose the user a proposed water recipe stored in the database. Then, the method requests the user to generate the user generated water recipe by inputting data by determining concentration of the at least one ion by the user into a user interface displayed on the input/output unit based on the proposed water recipe as a starting recipe.

The method may select the proposed water recipe based on at least one water drinking purpose described above and a user preference.

The method may exchange at least a portion of one type of ions by another type of ions.

The method may request the user to indicate at least one ion to remove. The method may exchange at least a portion of the at least one type of ion selected by the user by another type of ion for generating the user defined water recipe. The beverage may be output to a user vessel. The recipe may be stored in a database. The method may request a user to assess the user defined water recipe. The assessment of the water recipe by the user may be stored in the database.

The method may request the user to select a water recipe stored in the database. The method may request the user to generate the user generated water recipe by inputting data by determining concentration of at least one ion by user into the user interface based on the selected water recipe. The set concentration may be achieved by replacing at least a portion of at least one type of minerals.

The method may propose the user a proposed water recipe stored in the database and request the user to generate the user generated water recipe by inputting data by determining concentration of at least one ion by the user interface displayed on the input/output unit based on the proposed water recipe. The method may replace at least a portion of at least one type of ion in order to achieve an actual concentration that corresponds to the set concentration of the at least one ion.

The invention also discloses a computer program product that when loaded into the memory of a computer comprising a central processing unit executes the steps of the above described methods.

The beverage dispensers according to the present invention are suited for use in a household, office, restaurant, nursing facility and the like. The pump is only operated by the controller, if a user requests water to be outputted by the beverage dispenser. The flow rate at the flow sensor is controlled as described above as soon as the user requests water to be outputted by the beverage dispenser. As soon as the desired quantity of water has been output, the controller stops operation of the pump. The flow type tempering device, the flow type carbonizer and/or the mineralization device are only operated by the controller, when the pump is pumping water through the reverse osmosis filter, the flow type tempering device, the flow type carbonizer and/or the mineralization device.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The present invention is now described with reference to the enclosed drawings depicting exemplary and nonlimiting embodiments of the present invention, wherein.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
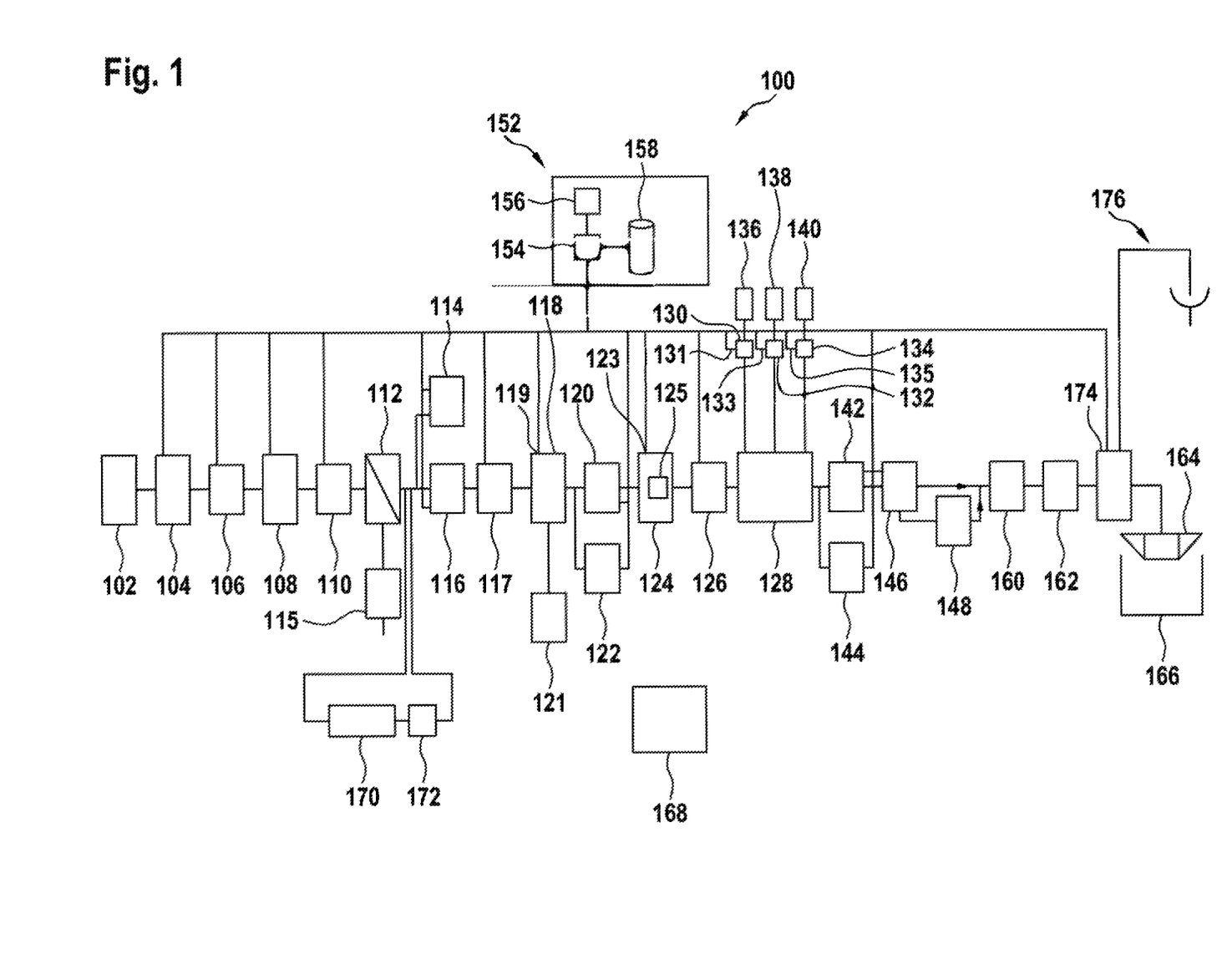
FIG. 1 is a schematic view of one embodiment according to the present invention.

FIG. 1 shows a water dispenser 100 according to the present invention. A pump 104 is connected to a water source 102. The water source can be a tank or a tap. The pump 104 is controlled by a controller 154 of a control unit 152. The controller 154 controls the flow rate and/or pressure generated by the pump 104. The pump 104 is connected downstream to a prefilter 108. Between the pump 104 and the prefilter 108 a first pressure sensor 106 is connected. The first pressure sensor 106 can act as a pump output pressure sensor and as a prefilter input sensor. The first pressure sensor 106 is connected to the controller 154. The prefilter 108 can be a sediment filter and/or an activated carbon filter.

The prefilter 108 can be connected downstream with the input of a reverse osmosis filter 112. Between the prefilter 108 and the input of the reverse osmosis filter 112 a second pressure sensor 110 can be connected. The second pressure sensor 110 is connected to the controller 154. The second pressure sensor 110 may act as a prefilter output pressure sensor and as a reverse osmosis input pressure sensor.

The controller can verify, whether the pressure difference of the pressure determined by the first pressure sensor 106 and the second pressure sensor 110 exceeds a predetermined threshold. If the pressure difference between the pressure determined by the first pressure sensor 106 and the pressure determined by the second pressure sensor 110 exceeds a predetermined threshold, the prefilter 108 may be clogged. If such pressure difference is below a predetermined threshold, a leakage may occur in the prefilter 108.

The reverse osmosis filter 112 comprises a membrane through which the permeate passes. The concentrate passes a concentrate output pressure sensor (third pressure sensor) 115 and flows to a drain (not shown).

To the permeate output of the reverse osmosis filter 112 a fourth pressure sensor 116 and a first conductivity sensor 114 are connected. The fourth pressure sensor 116 can act as a permeate output pressure sensor. The conductivity sensor 114 and the fourth pressure sensor 116 are connected to the controller 154. If the pressure difference between the pressure measured by the second pressure sensor 110 and the pressure measured by the fourth pressure sensor 116 exceeds a predetermined value, the membrane of the reverse osmosis filter 112 may be clogged. If such pressure difference is below a predetermined threshold, a leakage may occur in the reverse osmosis filter 112.

The reverse osmosis filter 112 demineralizes the water, such that the water output by the reverse osmosis filter permeate output is demineralized. A first conductivity sensor 114 is connected to the permeate output of the reverse osmosis filter. The first conductivity sensor 114 is connected to the controller 154.

If the controller 154 determines that the conductivity measured by the first conductivity sensor 114 at the permeate output of the reverse osmosis filter 112 exceeds a predetermined threshold, stagnation, back diffusion and/or germ formation may have been occurred.

Downstream of the fourth pressure sensor 116 a carbonizer 118 is connected. Between the fourth pressure sensor 116 and the carbonizer 118 a flow sensor 117 determining the flow rate of the water flowing downstream of the permeate output of the reverse osmosis filter 112 is connected. The flow sensor 117 is also connected to the controller 154.

According to a first embodiment, the controller 154 is adapted to control the pump 104 such that the actual flow rate as determined by the flow sensor 117 is within a predetermined tolerance range around a set flow rate. Thereby, the water dispenser 100 comprises a constant flow rate downstream of the permeate output of the reverse osmosis filter 112.

The carbonizer 118 injects carbon dioxide into the water. The fourth pressure sensor 116 may also act as a carbonizer input sensor. Downstream of the carbonizer 118 a fifth pressure sensor 120 connected to the controller 154 is arranged. The fifth pressure sensor 120 can act as a carbonizer output pressure sensor. If the controller 154 determines that the pressure difference between the pressure determined by the fourth pressure sensor 116 and the pressure determined by the fifth pressure sensor 120 is above a predetermined threshold, the carbonizer 118 may be clogged. If such pressure difference is below a predetermined threshold, a leakage in the carbonizer 118 may have occurred.

To the output of the carbonizer 118 also a first pH-value sensor 122 is connected. The first pH-value sensor 122 determines the pH-value of the carbonized water at the output of the carbonizer 118. The first pH-value sensor 122 is connected to the controller 154. If the pH-value at the output of the carbonizer 118 is above a predetermined threshold, the water has not been carbonized appropriately. This may be the case if a bottle 121 comprising carbon dioxide is depleted or if the carbonizer 118 is not working properly.

Downstream of the fifth pressure sensor 120 a flow type tempering device 124 is connected. The flow type tempering device 124 is connected to the controller 154 and receives from the controller 154 a set output temperature value. The flow type water tempering device comprises an output temperature sensor 125. The flow type water tempering device 124 controls cooling the water flowing through the water tempering device such that the actual water temperature determined by the internal temperature sensor 125 is within a predetermined range around the set water temperature as stipulated by the controller 154.

The fifth pressure sensor 120 can act as a flow type tempering device input pressure sensor. Downstream of the water tempering device 124 a sixth pressure sensor 126 is arranged that is connected to the controller 154 and acts as a flow type tempering device output pressure sensor. If the pressure difference between the pressure determined by the fifth pressure sensor 120 and the pressure determined by the sixth pressure sensor 126 exceeds a predetermined threshold, the flow type tempering device may be clogged. If such pressure difference is below a predetermined threshold, in the flow type tempering device a leakage might have been occurred.

Downstream of the sixth pressure sensor 126 a mineralization device 128 is arranged. The mineralization device 128 comprises a first valve 130 connected to a first mineralization fluid vessel 136, a second valve 132 connected to a second mineralization fluid vessel 138 and a third valve 134 connected to a third mineralization fluid vessel. The first valve 130, the second valve 132 and the third valve 134 are controlled by the controller 154. If a user requests a beverage 168 to be output by the water dispenser 100 the user may select a water recipe by an input/output unit 168 and/or the water dispenser 100 may propose the user a water recipe on the input/output unit 168. The water recipes are stored in the database 158. During producing the beverage, the controller 154 retrieves the selected or appropriate water recipe from the database 158 and determines which types of minerals are to be added in a predefined concentration to the water flowing through the mineralization device 128. Depending on the selected water recipe the controller instructs the first valve 130, the second valve 132 and/or the third valve 134 to inject an appropriate amount of minerals into the water flowing through the mineralization device 128. Since the first mineralization fluid vessel 136, the second mineralization fluid vessel 138 and the third mineralization fluid vessel 140 comprising different minerals, a plurality of different water recipes may be generated. In the example of FIG. 1 merely three mineralization fluid vessels and valves are shown for the sake of brevity. A preferred embodiment may comprise six or seven mineralization fluid vessels each connected to a valve controlled by the controller.

Downstream of the mineralization device a seventh pressure sensor 142 is connected acting as a mineralization device output pressure sensor, wherein the sixth pressure sensor 126 also acts as a mineralization device input pressure sensor. If the controller 154 determines that the pressure difference between the sixth pressure sensor 126 and the pressure determined by the seventh pressure sensor 142 exceeds a predetermined threshold, the mineralization device may be clogged. If this pressure difference is below another predetermined threshold, a leakage may occur within the mineralization device.

At the output of the mineralization device an ion concentration sensor 144 is connected, which is implemented by a conductivity sensor or galvanic sensor and is also connected to the controller 154. The ion concentration sensor 144 can determine the concentration of at least one type ion in the water. If the ion concentration of at least one type ion determined by the ion concentration sensor is not within a predefined range, the mineralization device 128 might not operate properly, for example the valves 130, 132, 134 might be clogged or the mineralization fluid vessels 136, 138, 140 might be clogged or empty.

The ion concentration sensor 144 may comprise an array of a plurality ion-selective sensors for determining the concentration of a plurality of types of ions. An ion-selective membrane may be arranged around one of the two electrodes of each ion-selective sensor. Each ion-selective sensor may comprise a galvanic sensor having two electrodes.

To each water recipe an individual set ion concentration may be assigned. The controller can verify via the ion concentration sensor 144, whether the actual ion concentration is within the set range of the ion concentration for the respective water recipe. The set ion concentration of at least one type of ion for each water recipe may be stored in the database 158.

Downstream of the seventh pressure sensor 142 a flow control device 146 is arranged. In a first switching state the flow control device 146 can pass all of the water output by the mineralization device 128 to an ion exchanger 148. In a second switching state the flow control device 146 passes no water to the ion changer 148. In a third switching state the flow control device 146 passes a portion of the water output by the mineralization device 128 to the ion exchanger 148 and the complementary portion is bypassed such that it does not flow through the ion exchanger 148. The flow control device 146 is controlled by the controller 154.

The ion exchanger 148 can substitute at least one type of ions by at least one other type of ions. The ion exchanger 148 may comprise a plurality of ion exchangers. The ion exchanger 148 may comprise a cation exchanger. The cation exchanger 148 may exchange calcium ions by lithium ions. Thereby, a broader range of water recipes can be implemented for generating beverage without the need of additional mineralization vessels 136, 138, 140.

The cation exchanger 148 may substitute $Ca_2^+$ by $Na^+$, $Ca_2^+$ by $Li^+$, $Mg_2^+$ by $Na^+$, $Mg_2^+$ by $Li+$, $Ca_2^+$ by $K^+$, $Mg_2^+$ by $K^+$ and/or $Al_3^+$ by $Ca_2^+$.

Additionally or alternatively the ion exchanger 148 may comprise an anion exchanger substituting a non-organic anion by an organic anion. Particularly, the anion exchanger may substitute $Cl^-$ by citrate and/or $SO_4^{2-}$ by citrate.

Downstream of the ion exchanger 148 and the flow control device 146 a second ion concentration sensor 160 connected to the controller 154 can be arranged. The second ion concentration sensor can be implemented as the first ion concentration sensor 144. The second ion concentration sensor can verify whether the actual concentration of at least one type of ion is within a set range. Particularly, the second ion concentration sensor can verify, whether the ion exchanger 148 has substituted the appropriate type and the appropriate amount of ions.

In the embodiment according to FIG. 1 two ion concentration sensors 144, 160 are shown. However, another embodiment may comprise only the second ion concentration sensor 160 and a further embodiment may comprise only the first ion concentration sensor 144.

The database 158 may comprise set concentration ranges of at least one type of ions for each water recipe, wherein the processor 154 verifies, whether the actual concentration of the at least one type of ion as determined by the second ion concentration sensor 160 is within the set concentration range. If this condition is not fulfilled, the ion exchanger 148 may be depleted or the flow control device 146 may not be operating appropriate.

Downstream of the second ion concentration sensor 160 a first temperature sensor 162 connected to the controller 154. The first temperature sensor 162 can determine the actual temperature of the beverage output to the user by a nozzle 164 into a user vessel 166 and the processor 154 may determine, whether actual temperature is within a set temperature range. If the processor 154 determines that the temperature of the beverage determined by the first temperature sensor 162 is not within the set temperature range, the processor 154 may command to the tempering device 124 an updated set temperature. Thereby, a cascaded control of the temperature of the beverage output to a user may be achieved.

The water dispenser 100 further comprises a heater 170 comprising an input connected to the permeate output of the reverse osmosis filter 112. The heater 170 heats the water exiting from the permeate output of the reverse osmosis filter 112 to a predetermined temperature for disinfection purposes. Downstream of the heater of 170 a second temperature sensor 170 connected (not shown) to the processor 154 is arranged. The second temperature sensor 172 verifies, whether the water is heated in the heating device 170 to the set temperature, i.e. whether the actual temperature as determined by the third temperature sensor 172 is within the set temperature range.

In one embodiment, an output valve 174 may be connected between the first temperature sensor 162 and the nozzle 164. Particularly, the input of the output valve 174 is coupled with the output of the first temperature sensor 162, the first output of the output valve 174 is coupled with the nozzle 164 and the second output of the output valve 174 is coupled to a drain 176. The output valve 174 is coupled with the controller 154. The controller 154 is adapted to switch the output valve 174 in a first state, in which the water is output by the nozzle 164 into the user vessel 166 or in a second state, in which the beverage is passed to the drain.

The controller 154 verifies, whether the actual temperature of the water as determined by the first temperature sensor 162 is within the set temperature range. Further, the controller 154 verifies, whether the actual ion concentration of the water as determined by the first ion concentration sensor 144 and/or second ion concentration sensor 160 is within the set concentration range. The controller 154 also verifies, whether the actual carbonization of the water as determined by the pH-value sensor 122 is within the set concentration range.

The controller switches the output valve into a first state, if the user instructs the water dispenser 102 to output water and the controller 154 determines that the flow type carbonizer 118 has carbonized the water appropriately, such that the actual carbonization is within the set carbonization rate and/or the flow type tempering device 124 has tempered the water such that the actual temperature of the water is within the set temperature range and/or the mineralization device 128 has mineralized the water such that the actual mineralization is within the set mineralization rate.

The controller switches the output valve into the second state, if the user instructs the water dispenser 100 to output water and the controller 154 determines that the actual carbonization is not within the set carbonization rate and/or the actual temperature is not within the set temperature range and/or the actual mineralization is not within the set mineralization range. In this case, the water is passed to the drain 176. The drain may be an outlet connected to a drain of a building or a tank.

The controller switches the output valve 174, if the user instructs the water dispenser to abort outputting water. The user can stop the output of beverage, if the vessel is completely filled and the water dispenser 100 is still outputting water.

In the first embodiment described above, the controller 154 is adapted to control the pump 104 such that the actual flow rate as determined by the flow sensor 117 is within a predetermined tolerance range around a set flow rate. According to a second embodiment, the controller 154 is adapted to control the carbonization rate of the flow type carbonizer 118 such that the carbonization rate is proportional to the flow rate determined by the flow sensor 117. Further, the controller 154 is adapted to control the mineralization device 128 such that the mineralization is proportional to the flow rate determined by the flow sensor 117.

The controller controls the carbonization rate of the carbonizer 118 by a signal transmitted to the carbonization rate input 119. The controller 154 controls the mineralization rate of the first valve 132 by a signal transmitted to the mineralization rate input 131 of the first valve 130. The controller 154 controls the mineralization rate of the second valve 132 by a signal transmitted to the mineralization rate input 133 of the second valve 132. The controller controls the mineralization rate of the third valve 134 for by the signal transmitted to the mineralization rate input 135 of the third valve.

The controller 154 may transmit the actual flow rate to the flow rate input 123 of the flow type tempering device such that the internal control loop can adapt the tempering of the water to the actual flow rate.

The second embodiment has the advantage that water can be provided even if a filter or any water preparation device is clogged or the water source 102 provides a low input pressure.

Figure 2:
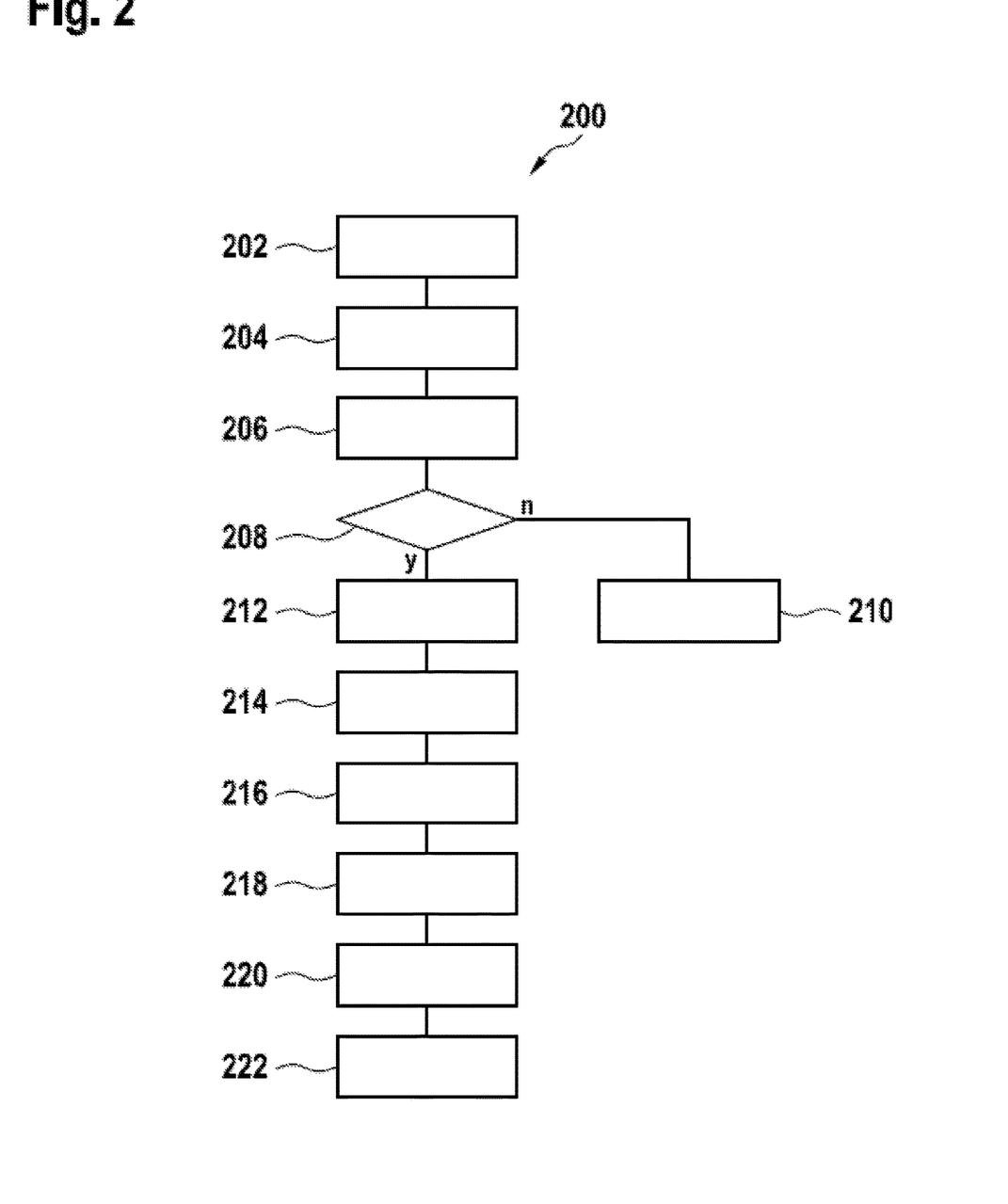
FIG. 2 is a flowchart of one embodiment of the present invention.

With reference to FIG. 2 an exemplary method for operating the water dispenser according to FIG. 1 is shown. In step 202 the user requests the water dispenser 102 to generate water.

In step 204 the water dispenser determines the drinking purpose, i.e. the reason why the user wants to drink water. Exemplary drinking purposes can be pleasure, thirst, health, refreshment, diet, pregnancy, breastfeeding, accompaniment of a predetermined type of wine, accompaniment of a predetermined type of food, water for brewing a predetermined type of tea, water for brewing a predetermined type of coffee, at least one physiological parameter of the user, at least one environment parameter of the location, in which the user is or was, the actual date, the current time, a user input. Further, the method determines in step 204 the preferences of the user. The method selects in step 204 a water recipe based on the drinking purpose and/or the user preference.

In step 206 the proposed recipe is displayed to the user, for example in an input/output unit 168 connected to the water dispenser 100 or an input/output unit 168 of a mobile device, such as a touch screen of a smart phone.

In step 208 the user can select, whether he wants to optimize the proposed water recipe, by inputting data on the input/output unit 168 of the water dispenser 100 or of the mobile device.

If the user wishes not to optimize the water recipe, the method continuous with step 210 and generates the water as has been described before with reference to FIG. 1. The controller 154 commands the pump 104 to pump water from the water source 102 to the reverse osmosis filter 112. Concurrently or the after the controller 154 activates the pump 104, the controller 154 activates the flow type carbonizer 118 and/or the flow type tempering device 124 and the mineralization device 128. As soon as the appropriate amount of water has been output by the nozzle 164 to the user vessel 166 operation of the pump 104 and/or the flow type carbonizer 118 and/or the flow type tempering 124 and/or the mineralization device 128 is stopped.

If the user decides in step 208 to optimize the water recipe, the method continues to step 212. The method displays in step 212 a user interface, particularly a graphical user interface on the input/output unit 168, in which the user may input data by the input/output unit 168, such as by gestures, touching icons or the like.

In step 214 the user operates the input/output unit 168 for optimizing the water recipe, particularly for defining the set ion concentration values according to his preferences. The input of the user is stored and passed to step 216.

In step 216 the water is produced essentially as described above with reference to FIG. 1. A first step, the controller 154 commands the pump 104 to pump water from the water source 102 to the reverse osmosis filter 112. Concurrently or the after the controller 154 activates the pump 104, the controller activates the flow type carbonizer 118 and/or flow type tempering device 124 and the mineralization device 128.

Further, in step 216 the set ion concentration values as optimized by the user are stored, for example in the database 158. If the water dispenser comprises the first ion concentration sensor 144 the actual ion concentration values are stored, for example in the database 158. If the water dispenser 100 comprises the second ion concentration sensor 160, the actual ion concentration values are stored, for example in the database 158.

The controller 154 verifies, whether the actual temperature of the water as determined by the first temperature sensor 162 is within the set temperature range. Further, the controller 154 verifies, whether the actual ion concentration of the water as determined by the first ion concentration sensor 144 and/or second ion concentration sensor 160 is within the set concentration range. The controller 154 also verifies, whether the actual carbonization of the water as determined by the pH-value sensor 122 is within the set concentration range.

As soon as the appropriate amount of water has been output by the nozzle 164 to the user vessel 166 operation of the pump 104 and/or the flow type carbonizer 118 and/or the flow type tempering 124 and/or the mineralization device 128 is stopped. The values optimized by the user are essentially interpreted as set ion concentration values and the controller controls the valves 130, 134 such that the water passing through the mineralization device 128 is mineralized according to the set ion concentration values as optimized by the user. Further, the controller 154 controls the flow control device 146 such that the appropriate amount of ions is exchanged by the ion exchanger 148 as described with reference to FIG. 1.

In step 218 the user is requested by the input/output unit 168 to drink the water. Consequently, the user drinks the water.

In step 220 user is requested to evaluate the water recipe and to enter his evaluation into the input/output unit 168.

In step 222 the set values of the ion concentration as optimized by the user and/or the actual ion concentration values as determined by the first ion concentration sensor 144 and/or the actual ion concentration values as determined by the second ion concentration sensor 160 are stored, such as in the database 158.

The present invention has the advantage that operation of a water dispenser can be monitored. Further, a wide range of water recipes can be generated without using an overly high amount of mineralization fluid vessels, since the water dispenser comprises at least one ion exchanger. Further, the operation of the mineralization can be monitored by the ion concentration sensors. Also, optimization of a user recipe can be monitored by the ion concentration sensors.

Since the flow rate of the permeate is controlled, there is a constant flow rate within the water dispenser. Thereby stagnations and tanks can be avoided that cause germ generation.

The term "water dispenser" does not exclude that with the water generated by the water dispenser further beverages can be generated such as juices, tea, coffee or the like. Thus, the term water dispenser includes also apparatus that are mineralizing water for generating further beverages, even if the water is not output into the user vessel but to another beverage machine. The water dispenser is suited for operation in a household, office, restaurant, hotel, hospital nursing facilities, sport facilities or the like.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not.

Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A beverage dispenser, comprising:
an inlet connected to a water source;
an outlet for dispensing the water to a user vessel;
at least one filter element having an input and an output for filtered water;
a pump for pumping water to the input of the filter element;
a flow sensor connected between the output for outputting filtered water and the outlet;
a plurality of water preparation elements connected between the output for outputting filtered water and the outlet and adapted to prepare the water for drinking by a human; and
a controller connected to the pump and the flow sensor, wherein the controller controls the pump such that filtered water has an actual flow rate that corresponds to a set flow rate, wherein the flow sensor determines the actual flow rate of the filtered water,
wherein the at least one filter element comprises a reverse osmosis filter, a permeate output and a concentrate output, wherein the permeate output is the output for filtered water;
wherein the controller controls the pump so that the flow rate downstream of the permeate output is constant independent of the amount of concentrate that is withdrawn from the water supplied by the water source;
wherein the plurality of water preparation elements comprises the following:
a flow type tempering device for cooling and/or heating the water;
a flow type carbonizer for injecting carbon dioxide into the water; and
a flow type mineralization device for mineralizing the water;
wherein no tank in which water can stagnate is arranged between the permeate output of the reverse osmosis filter and the outlet of the beverage dispenser; and
wherein the water flows from the output for outputting filtered water of the filter element to the outlet of the beverage dispenser with the set flow rate through any component located between the permeate output to the outlet of the beverage dispenser.

2. The beverage dispenser of claim 1, wherein the plurality of water preparation elements further comprises at least one of the following:
a flow type colorant device for coloring the water;
a flow type flavoring device for flavoring the water;
a flow type medication device for adding medicine to the water; and
a flow type additive introduction device for introducing additives into the water.

3. The beverage dispenser of claim 2, wherein the flow rate from the inlet of the beverage dispenser to the input of the filter element is constant in any component though which the water flows between the inlet of the beverage dispenser to the input of the filter element.

4. The beverage dispenser of claim 2, wherein:
no tank, in which water can stagnate is arranged between the inlet of the beverage dispenser and an input of the reverse osmosis filter.

5. The beverage dispenser of claim 2, further comprising:
a reverse osmosis filter input pressure sensor connected to the controller and arranged at the input of the reverse osmosis filter and determining the pressure at the input of the reverse osmosis filter; and
a reverse osmosis permeate output pressure sensor connected to the controller and arranged at the reverse osmosis permeate output and determining the pressure at the reverse osmosis permeate output; and
wherein the controller determines, whether the pressure difference between the pressure determined by the reverse osmosis filter input pressure sensor and the pressure determined by the reverse osmosis permeate output input pressure sensor is within a predetermined range.

6. The beverage dispenser of claim 2, further comprising a permeate conductivity sensor connected to the controller and arranged at the permeate output of the reverse osmosis filter, wherein the permeate conductivity sensor is adapted to measure the conductivity of the filtered water;
wherein the controller determines, whether the conductivity of the filtered water is within a predefined range.

7. The beverage dispenser of claim 2, further comprising:
a flow type tempering device input pressure sensor connected to the controller and arranged at an input of the flow type tempering device and determining the pressure at the input of the flow type tempering device; and
a flow type tempering device output pressure sensor connected to the controller and arranged at a flow type tempering device output and determining the pressure at the flow type tempering device output;
wherein the controller determines, whether the pressure difference between the pressure determined by the flow type tempering device input pressure sensor and the pressure determined by the flow type tempering device output pressure sensor is within a predetermined range.

8. The beverage dispenser of claim 2, further comprising:
a flow type carbonizer input pressure sensor connected to the controller and arranged at an input of the flow type carbonizer and determining the pressure at the input of the flow type carbonizer; and
a flow type carbonizer output pressure sensor connected to the controller and arranged at a flow type carbonizer output and determining the pressure at the flow type carbonizer output;
wherein the controller determines, whether the pressure difference between the pressure determined by the flow type carbonizer input pressure sensor and the pressure determined by the flow type carbonizer output pressure sensor is within a predetermined range.

9. The beverage dispenser of claim 2, further comprising a pH-value sensor connected to the controller and arranged at or downstream of an output of the flow type carbonizer and determining the pH-value at or downstream of the output of the flow type carbonizer;

wherein the controller determines, whether the pH-value at or downstream of the output of the flow type carbonizer is within a predetermined range.

10. The beverage dispenser of claim 2, further comprising:

a mineralization device input pressure sensor connected to the controller and arranged at an input of the mineralization device and determining the pressure at the input of the mineralization device; and a mineralization device output pressure sensor connected to the controller and arranged at a mineralization device output and determining the pressure at the mineralization device output;

wherein the controller determines, whether the pressure difference between the pressure determined by the mineralization device input pressure sensor and the pressure determined by the mineralization device output pressure sensor is within a predetermined range.

11. The beverage dispenser of claim 2, further comprising an ion concentration sensor connected to the controller and arranged downstream of an output of the mineralization device, wherein the ion concentration sensor is adapted to determine the concentration of predetermined ions in the water;

wherein the controller is adapted to determine, whether the actual ion concentration of predetermined ion type is within a set concentration range.

12. The beverage dispenser of claim 11, wherein the ion concentration sensor comprises an ion-specific galvanic sensor.

13. The beverage dispenser of claim 2, further comprising a first temperature sensor arranged downstream of the flow type tempering device, the flow type carbonizer and the mineralization device and determining a first actual temperature;

wherein the controller is adapted to determine whether the first actual temperature is within a predetermined range.

14. The beverage dispenser of claim 13, further comprising:

a heating device having an input connected to the permeate output of the reverse osmosis filter and an output; and a second temperature sensor arranged at the output of the heating device and determining the actual temperature of water at the outlet of the heating device;

wherein the controller is adapted to determine, whether the actual temperature of water at the outlet of the heating device has a temperature in a predetermined temperature range.

15. The beverage dispenser of claim 1, further comprising an output valve coupled between the plurality of water preparation elements and the outlet of the beverage dispenser and connected to the controller, wherein the controller is adapted to switch the output valve in a first state, in which the beverage is output to the user vessel or in a second state in which the beverage is passed to a drain, wherein:

the controller switches the output valve into the first state, if the user instructs the beverage dispenser to output beverage and the controller determines that the beverage preparation element has prepared the water such that at least one actual preparation value is within a set range;

the controller switches the output valve into the second state, if the user instructs the beverage dispenser to output beverage and the controller determines that the beverage preparation element has prepared the water such that at least one actual preparation value is not within a set range; and the controller switches the output valve into the second state, if the user instructs the beverage dispenser to abort outputting beverage.

* * * * *